United States Patent [19]

Tulpule et al.

[11] Patent Number: 4,696,019
[45] Date of Patent: Sep. 22, 1987

[54] MULTI-CHANNEL CLOCK SYNCHRONIZER

[75] Inventors: Bhalchandra R. Tulpule, Vernon; Edward M. Oscarson, Bristol; David J. Vosgien, Meriden, all of Conn.

[73] Assignee: United Technologies Corporation, Hartford, Conn.

[21] Appl. No.: 652,028

[22] Filed: Sep. 19, 1984

[51] Int. Cl.[4] .......................... H04L 7/00; G05B 15/08
[52] U.S. Cl. .................................... 375/107; 375/106; 328/72; 364/131
[58] Field of Search ....................... 375/107, 108, 106; 370/103; 328/72, 74, 75, 63; 329/126; 340/870.14; 364/131, 136

[56] References Cited

U.S. PATENT DOCUMENTS

| | | | |
|---|---|---|---|
| 3,050,586 | 8/1962 | Runyon | 370/103 |
| 4,005,266 | 1/1977 | Lehr et al. | 375/107 |
| 4,480,198 | 10/1984 | Gass | 307/200 A |

Primary Examiner—Robert L. Griffin
Assistant Examiner—M. Huseman
Attorney, Agent, or Firm—Francis J. Maguire, Jr.

[57] ABSTRACT

A synchronizer for use in synchronizing individual signal processors in a multi-channel system is disclosed. Each synchronizer has a counter for counting its associated processor's clock pulses and, upon reaching a selected count, providing a counter frame output signal at an output thereof for use by each of the other synchronizers in the system. Each synchronizer has a voter responsive to counter output signals from each of the other synchronizers, and from itself as well, at input ports thereof. Each synchronizer's voter provides a frame sync (macro sync) pulse in each counter frame after receiving a selected number of counter frame output signals from any of the synchronizers in the system. Each synchronizer's voted frame sync pulse is provided at an output port of the sychronizer and may be utilized, depending on the application, for routing back into the synchronizer at a frame sync input port for resetting the synchronizer's own counter, or, when used as a master, for routing to one or more (slave) synchronizers for the same purpose. Each synchronizer's voter includes a rising edge voter that arms a falling edge voter only during a selected portion of the expected counter frame period (voting window). The synchronizer voter architecture can include clocked latches or not. The synchronizer may include fast and slow clock detectors. The synchronizer interfaces with its associated processor and includes disable circuitry for permitting the CPU to disable nonfunctional frame sync signals.

13 Claims, 22 Drawing Figures

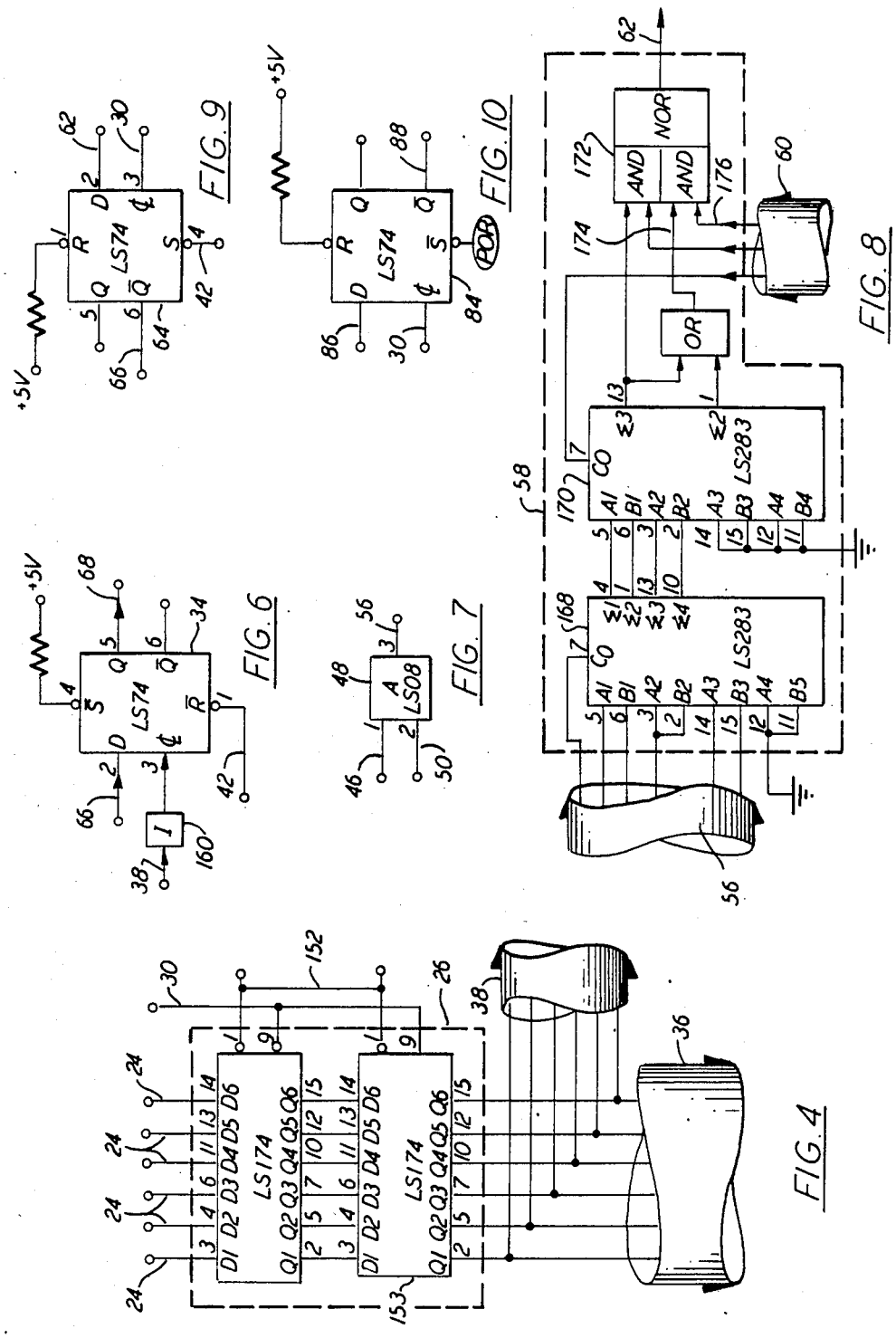

MULTI-CHANNEL CLOCK SYNCHRONIZER

The U.S. Government has rights in this invention pursuant to contract NAS-2-11771.

TECHNICAL FIELD

This invention relates to synchronizing a plurality of channels in a multi-channel system.

BACKGROUND ART

In systems with, for example, a plurality of computers which must communicate with each other there is a need for all of the computers to be synchronized. A plurality of computers might be found in a system having redundant channels, for example. From a common mode failure standpoint it is not desirable to implement the synchronizing function in a single computer. It is difficult to achieve the twin objectives of common mode failure avoidance (via redundancy) and assured synchronization.

In order to provide synchronization, a "voting" function may be performed among the various parts of the system. For example, U.S. Pat. No. 4,330,826, discloses a SYNCHRONIZER AND SYNCHRONIZATION SYSTEM FOR A MULTIPLE COMPUTER SYSTEM, filed Feb. 5, 1980, issued May 18, 1982, granted to Whiteside et al, and assigned to the Bendix Corporation. In the Whiteside synchronization system a plurality of identical synchronizing algorithms are provided to each computer in a multiple computer system. Each synchronizer receives sampling number messages from like synchronizers in the other computers and compares the received messages in order to find a sampling number which agree with a sampling number stored internally and "votes" on a predetermined number of correct sampling number messages received from the other synchronizers to generate a voting sampling number having the same or closest value to the number found in storage.

The main disadvantage of the Whiteside algorithmic procedure for synchronization is that it must be excuted by a correctly operating processor in software. The procedure is iterative, requires processor time overhead, and cannot achieve the kind of very tight frame synchronization which is most desirable. The software approach has the potential for generating common mode faults to the redundant system due to the presence of a faulty processor or cross channel data link.

It is generally very difficult to design software to correctly detect and isolate failures and this is particularly true in the absence of a reliable time reference.

DISCLOSURE OF INVENTION

The object of the present invention is to provide a clock synchronizer for use in multi-channel distrubuted systems having a need for each distributed unit to be frame synchronized with the other units in the system.

According to the present invention, a system having a plurality of units requiring frame synchronization is provided with a synchronizer for each unit, each synchronizer internally generating clock pulses which are counted to a selected total, each synchronizer providing a drive sync signal to each of the other synchronizers in the system, each synchronizer having a voter responsive to sync drive signals from the other synchronizers as well as its own internally generated sync drive signal, each synchronizer voter generating a voted frame sync signal for internal use, for signaling the unit's associated processor and initializing other hardware elements, and for resetting the count of the synchronizer's counter in the presence of a selected minimum number of sync drive signals received from a corresponding number of synchronizers which number may include its own internally generated sync drive signal, said selected number being less than or equal to the total number of synchronizers in the system.

In further accord with the present invention, the voter has a rising edge voter responsive to the rising edge of both the internal sync drive and the sync drive signals from the other channels and which votes on the number of sync signals present and produces an arm signal which enables a falling edge voter in the presence of the selected minimum number of sync drive signals. The falling edge voter responsive to the falling edges of both the internal sync drive signal and the sync drive signals from the other channels and votes on the number of sync signals present and produces a macro sync signal also called a frame sync signal in the presence of the selected minimum number of sync drive signals.

In still further accord with the present invention, each synchronizer further comprises means for disabling its own sync drive signal or any of the received sync pulses from the other synchronizers at the synchronizer input end in the presence of a disable signal from the associated unit's processor.

In still further accord with the present invention, each synchronizer's voter may be programmable for selecting different numbers of sync drive signals, in combination, from itself and the other synchronizers, which will cause a voted frame sync signal to be generated.

In still further accord with the present invention, each synchronizer further comprises both a loss of sync pulse detector and a fast sync pulse detector responsive to the internally generated frame sync pulses for disabling the synchronizer's sync pulses at the synchronizer's output end and providing a channel sever (fail safe state) request signal in response to the detection of abnormal sync pulses.

In still further accord with the present invention, each synchronizer is standardized for modular use and expansion by providing the synchronizer's internally generated voted frame sync pulses at an output port for external routing back to its own input for single synchronizer channels or for routing to another synchronizer within a channel, for cases where a number of slave synchronizers in a channel are piggybacked onto a master which is used to provide the voted frame sync for resetting both the master synchronizer counter and all the slave synchronizer counters in the channel.

In still further accord with the present invention, each synchronizer incorporates a voting window which prevents voting except during a brief window centered around the synchronizer's own internally generated sync pulses.

Each of the distributed synchronizers according to the present invention is driven by sync drive signal pulses from each of the redundant channels in such a way that a frame sync signal, otherwise known as a "macro sync" signal developed internally in each channel, is produced at about the same time in all channels. The difficulties of the prior art in achieving the twin objectives of common mode failure avoidance via redundancy and assured synchronization are eliminated according to the present invention without placing extremely tight requirements on the clock oscillators, processor throughput or data link noise susceptibility in each of the redundant channels.

The hardware implemented synchronizer according to the present invention uses voting of redundant sync drive signals in each channel to achieve tightly coupled locally generated frame sync (Macro Sync) signals in each channel. This is achieved with no processor overhead, no common mode faults, fault tolerance (noise immunity), and fast detection and correct isolation of fast/slow sync signals.

These and other objects, features and advantages of the present invention will become more apparent in light of the detailed description of a best mode embodiment thereof, as illustrated in the accompanying drawing.

BRIEF DESCRIPTION OF THE DRAWING

FIG. 4 shows the input latches of FIG. 2 in more detail;

FIG. 6 is a simplified schematic diagram of one of the falling edge latches of FIG. 2;

FIG. 7 is a simplified schematic diagram of one of the disable gates of FIG. 2;

FIG. 8 is a simplified schematic diagram of Voter No. 1 of FIG. 2;

FIG. 9 is a simplified schematic diagram of the MS arm latch of FIG. 2;

FIG. 10 is a simplified schematic diagram of the MS latch of FIG. 2;

FIG. 11 is a simplified schematic diagram of the countdown chain of FIG. 2;

FIG. 12 is a simplified schematic diagram of the slow clock detector of FIG. 2;

FIG. 13 is a simplified schematic diagram of the fast clock detector of

FIGS. 14, 14a and 14b, combined, is a simplified schematic block diagram of a synchronizer according to the present invention;

BEST MODE FOR CARRYING OUT THE INVENTION

Figure 1:
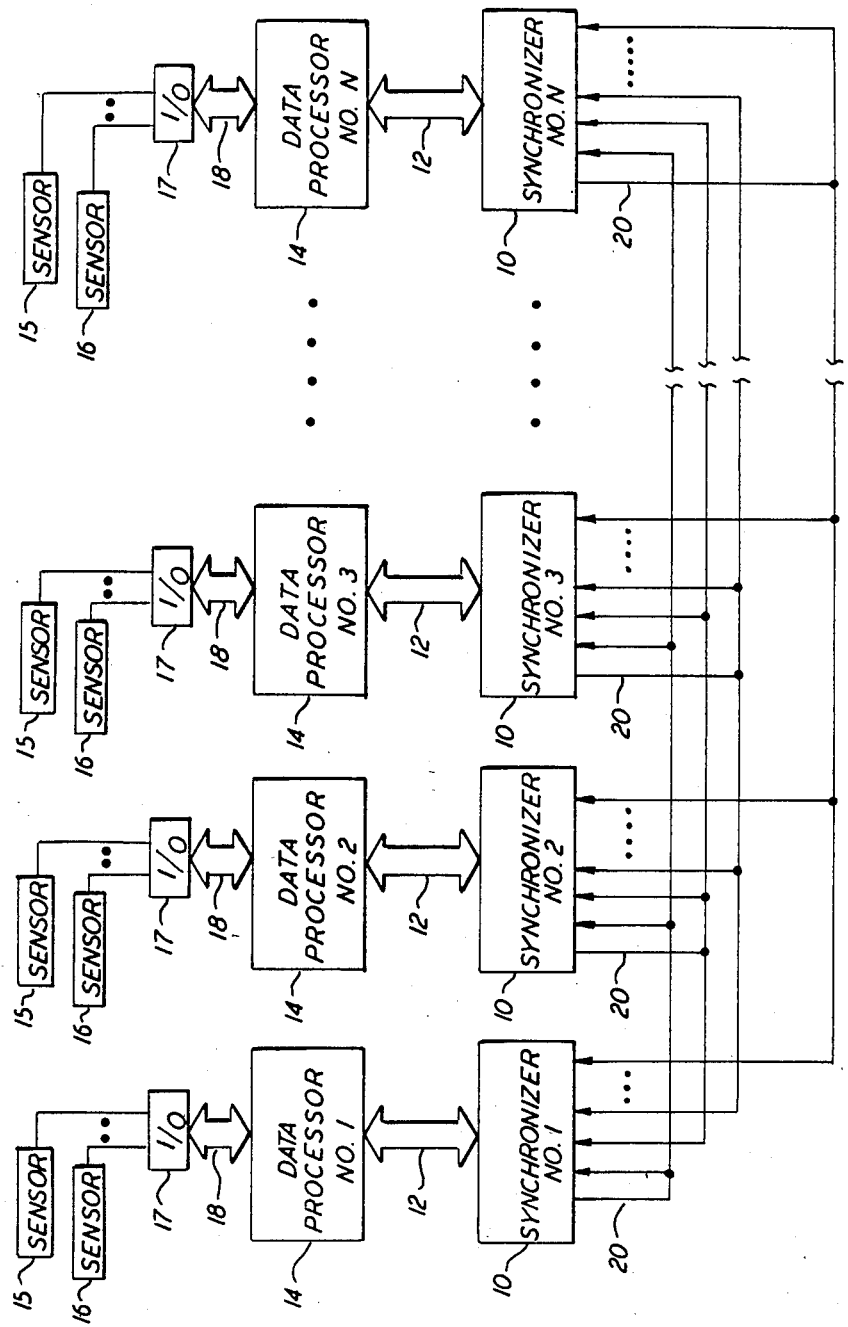
FIG. 1 is a simplified block diagram of a multi-data-processor system in which the processors must be synchronized to each other and which employs several (N) synchronizers according to the present invention.

FIG. 1 illustrates a system in which several synchronizers 10 each according to the present invention are utilized. In the best mode embodiment the synchronizers are manufactured identically so that they are interchangeable. Each synchronizer is a self-contained assembly of electronic components and circuitry of uniform structure which may be used repeatedly in modular fashion in a variety of systems. The advantages of modular construction will become apparent later in connection with the description below.

Each synchronizer is electrically connected by means of lines 12 to a corresponding data processor 14. In redundant processor systems the data processors 14 are typically capable of receiving information from redundant sensors 15, 16 from I/O devices 17 on lines 18.

It is advantageous in such a system for each of the data processors 14 to be synchronized with all of the other data processors 14 in the system. Each synchronizer 10, according to the present invention, provides an internally generated sync drive signal on a line 20 to itself and also to each of the other synchronizers 10 in the system. Each synchronizer receives each of the other synchronizers' sync drive signals for internally effecting synchronization with the other synchronizers in the system. The means of achieving synchronization is described in more detail below.

The data processors 14 of FIG. 1 are numerically identified as numbers 1, 2, 3, ... N, in order to indicate that the number of individual synchronizers, according to the present invention, which may be associated together within a system is not limited to any specific total number. Because of the modularity of the synchronizers, the number of data processors which may be synchronized using the synchronizer of the present invention is theoretically unlimited. Again, the modularity concept will be disclosed in greater detail below.

Figure 2:
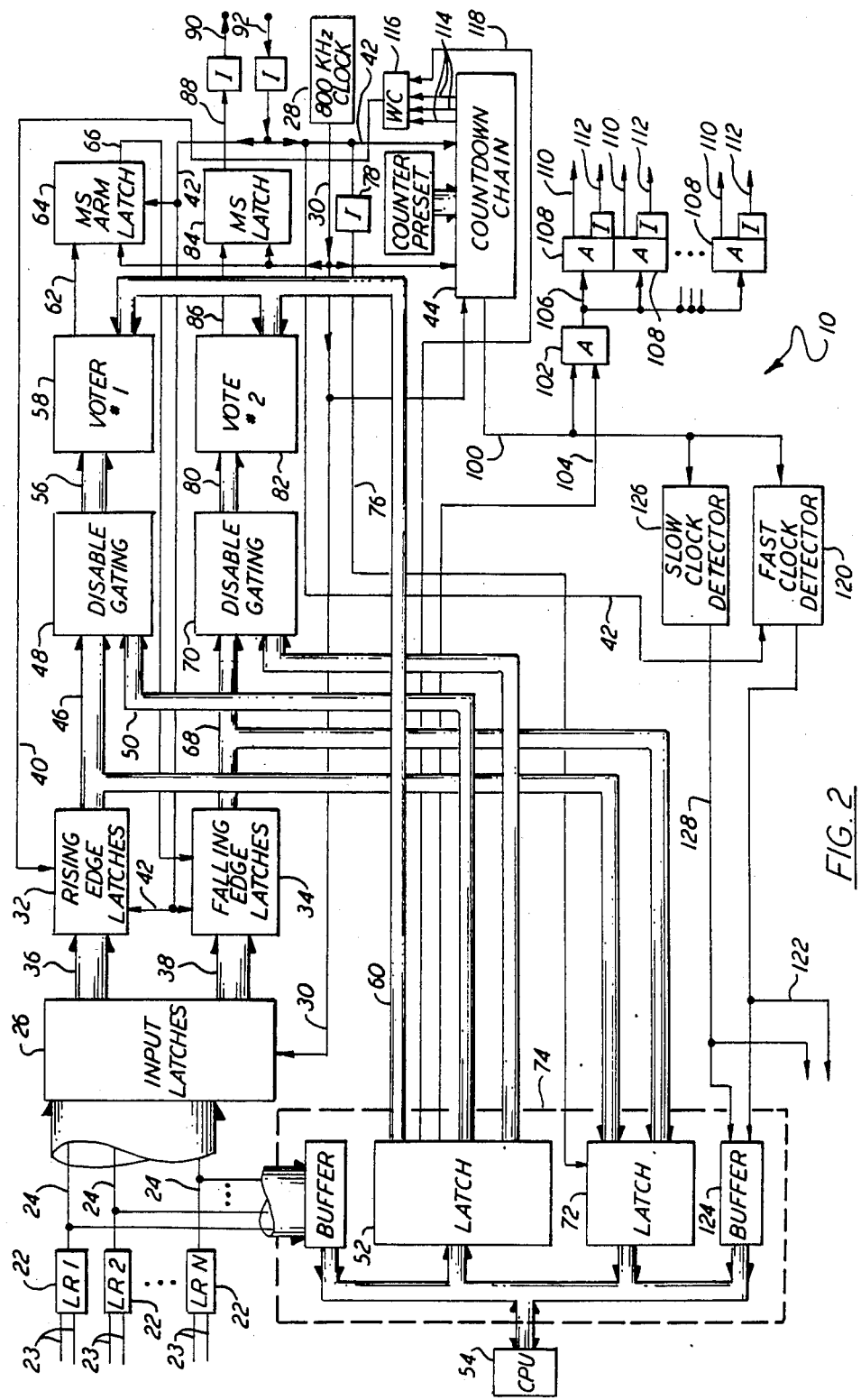
FIG. 2 is a simplified block diagram of a synchronizer according to the present invention.

FIG. 2 is a simplified Block Diagram of an embodiment of the synchronizer 10 of FIG. 1, according to the present invention. The synchronizer includes line receivers 22 which may be SN55115 dual differential line receivers. The line receivers convert a differential 5 volt sync signal on lines 23 to a TTL compatible 0-5 volt signal on lines 24. The inputs to the receivers are biased such that removal of power from a line driver, an open on both inputs, or shorted inputs will cause a stable output state on the affected line receiver's output.

FIG. 2 shows "N" differential sync drive signals 23 received from "N" synchronizers including the synchronizer illustrated in FIG. 2. Although the number of sync drive inputs from the various synchronizers in the system is theoretically unlimited, in practice the number of sync drive inputs which a given modular synchronizer may accept would normally be limited. In the embodiment shown in FIG. 2 the number of sync drive inputs is set at six. Systems that require a larger number of synchronizers can piggyback the modular units in a manner to be discussed in detail below. However, it should be understood that the number of sync drive inputs to a synchronizer could be greater or less than six by any amount.

The incoming sync drive signals are latched in input latches 26 with an internal system clock 28 on a line 30. The input latches, which may be 54LS174 Hex/Quadruple D-Type Flip-Flops, synchronize the incoming sync signals on the lines 24 to the internal system clock 28. In this embodiment the frequency is 800 KHz, but can be changed to meet system requirements. The input synchronization is needed to prevent "glitches" from being clocked into the vote latches 32, 34. The 800 KHz clock used here for synchronization can put a maximum 1.25 microsecond skew on the voted sync between channels. Increasing the clock frequency will reduce the time skew. The latched outputs are provided on line 36, 38 to Rising Edge Latches 32 and Falling Edge Latches 34, respectively.

The Rising Edge Latches 32 are made up of "N" Rising-Edge-Triggered "D" Flip-Flops. Each Flip-Flop is associated with one of the incoming sync signals on the lines 24. They are used to catch the transitional rising edge of the sync signal. The rising edge latches 32 are responsive to an enable signal on a line 40 and a reset signal on a line 42. The enable signal on the line 40 is used to enable the rising edge latches' ability to detect transitions only during a time window during which the transition is expected to occur. In the embodiment shown in FIG. 2, the window is from 70 percent to 90 percent of the 12.5 millisecond frame, and the transition should occur at the 80 percent point. The timing for the window (which can be reduced for improved noise immunity) is generated by an internal sync countdown chain 44. In this embodiment the timing is preselected at 20% of the 12 ½ millisecond frame. The reset signal on the line 42 is used to clear both the rising and falling edge latches when the synchronizer generates a vote. This sets the latches up for the next transition. The signal used to clear the latches on the line 42 is the voted sync, also called "macro sync". The rising edge latched data is provided on lines 46 to disable gating 48. The disable gating 48 includes a series of AND gate circuits, which may be 54LS08 circuits, one AND gate for each of the N channels. One input of each AND gate is connected to an output of the Rising Edge Latches 32. The other input is provided on a line 50 by a Sync Control Latch 52, which may be a 54LS273 Octal D Flip-Flop. A CPU 54, not part of the synchronizer, can set the bits on the lines 50 into individual AND Gates in the disable gating 48 to allow the associated sync signal to pass through or can not set the bit and block the sync signal. If the CPU sets the bit and allows an individual sync signal to pass through, the disable gating (the associated AND Gate) will generate a rising edge transition that coincides with the rising (leading) edge of the incoming sync signal on the line 24. This signal is provided on a line 56 to a Voter No.1 58.

Voter No. 1 58 is a ones adder, which may be made with two 54LS283 adders, whose output is the number of inputs that are at a logic "1". The outputs are connected to a comparator, which may be made with one half of a 54LS51 AND/OR-invert gate, that produces an output if the number from the adder is greater than the number programed by the CPU 54. A two bit CPU programmed input on lines 60 is provided by the latch 52 and allows voting on the first sync edge detected or on up to 4 of 6 edges, in one embodiment of the invention. The comparator output signal on a line 62 is clocked by the clock signal on the line 30 into an MS ARM latch 64, which may be a 54LS74 D-Type Flip-Flop, to indicate that a vote has taken place.

The MS ARM Latch 64 is used to deglitch the ARM signal on the line 62. By clocking the input latches 26 with the same clock signal on the line 30 as the MS ARM Latch 64, any glitches caused by the voting are removed. (This statement is true as long as the propagation delay from the input latches 26 to the MS ARM latch 64 is less than one clock period). The MS ARM latch output on a line 66 enables the Falling Edge Latches 34 after voter No. 1 58 produces a vote. The MS ARM latch is cleared by the macro sync signal on the line 42 when the voting is complete.

The Falling Edge Latches 34 are six Rising-Edge-Triggered "D" Flip-Flops in the embodiment of FIG. 2. Of course, the number of Flip-Flops will vary depending on the number of sychronizer inputs that the sychronizer is capable of receiving. As explained above, the number six was selected for the embodiment described herein for practical reasons not connected with the inventive concept. The Falling Edge Latches 34 are used to catch the transition of the Falling Edges of the sync signals on the line 38. The Falling Edge Latches 34 may be made of 54LS74 Flip-Flops. The latches 34 are enabled by the MS ARM Latch 64 output signal on the line 66. The enable input is thus used to enable the latches' ability to detect transitions only after the MS arm signal on the line 66 is present. As described above, a reset signal on the line 42 is used to clear the latches when the vote occurs. This sets the latches up for the next transition. The signal used to clear the latches on the line 42 is voted sync, also called macro sync. The output of the falling edge latches 34 is provided on a line 68 to disable gating 70 and to a latch 72 within a CPU interface circuit 74, which may or may not be part of the synchronizer. The Rising Edge Latched signals are also provided on the line 46 to the latch 72. The Rising and Falling Edge Latched signals are provided on the lines 46, 68 to the CPU latch 72 in order to provide the CPU 54 with needed information concerning the reception or non-reception of sync signals within the anticipated time windows. The latch 72 can be made of an octal "D" Flip-flop such as would correspond to a 54LS374 Octal Flip-Flop. The Octal Flip-Flop latch 72 is clocked by an inverted macro sync signal on a line 76 provided by an inverter 78. The latch 72 will latch the state of the sync signals that caused the second vote.

The disable gating 70 is similar to the disable gating 48 and will not be discribed in detail. The disable gating 70 provides sync signals on lines 80 to a Voter No. 2 82.

Voter No. 2 82 is a ones adder which may be made from two 54LS83 adders, whose output is the number of inputs that are at a logic "1". The outputs are provided to a comparator, which may be made from a 54LS51 AND/OR gate, that produces an output if the number from the adder is greater than a number programmed by the CPU 54. A two bit CPU programmed input provided on lines 60 allows voting on the first sync edge detected or on up to 4 of 6 edges. Of course, it should be understood that the number of bits provided by the CPU will vary depending on the number of synchronizers with which the synchronizer can interface. The fact that the embodiment shown in FIG. 2 is a 4 of 6 voter should not be thought of as limiting the invention thereto. The comparator output is clocked into an MS latch 84, which may be made of a 54LS74 "D" Flip-Flop, to indicate that a vote has taken place.

The MS latch 84 is used to deglitch the output signal on a line 86 of Voter No. 2 82. By clocking the input latches 26 with the same clock signal on the line 30 as the MS latch 84, any glitches caused by the voting are removed. (As in the case of the MS arm latch 64, this is the case as long as the propagation delay from the input latches number 26 to the MS latch 84 is less than one clock period). The MS latch 84 output signal on a line 88 is called the frame sync signal and is also called the macro sync signal.

Figure 2A:
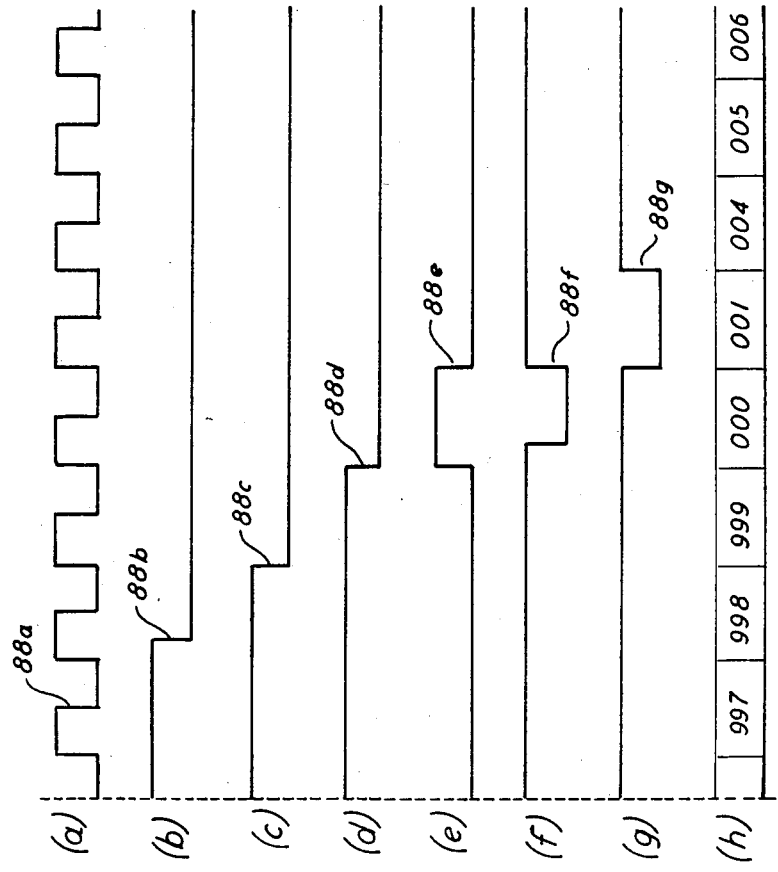
FIG. 2a is a timing diagram illustration of some of the signals of FIG. 2.

FIG. 2a contains illustrations of waveforms which will make the operation of the synchronizer more evident. Illustration (a) shows a waveform 88a illustrative of the 800 KHz clock signal on the line 30 of FIG. 2. Illustration (b) shows a waveform 88b illustrative of the particular one of the sync signals on the lines 24 of FIG. 2 which is the particular sync signal which causes the synchronizer "vote". This could be any one of the system synchronizers' sync signals including the particular synchronizer 10 illustrated in FIG. 2. Illustration (c) shows a waveform 88c illustrative of waveform 88b delayed by part of a clock cycle by a first input latch in the input latches 26 of FIG. 2. Illustration (d) shows a waveform 88d illustrative of waveform 88c delayed by the period of a full clock pulse by the last stage within the input latches 26 of FIG. 2. Illustration (e) shows a waveform 88e illustrative of the sync signal illustated by wave form 88b latched in one of the Falling Edge Latches 34 of FIGS. 2 & 6. Thus, the waveform 88e illustrates the signal on the line 68 of FIGS. 2 & 6 which corresponds to the particular one of the incoming sync signals on the lines 24 which causes the vote in the time frame illustrated. Illustration (f) shows a wave form 88f illustrative of the voter No. 2 82 voted output signal on the line 86. It will be noted that a propagation delay is illustrated. It should be understood that the waveforms of FIG. 2a are not to scale and the propagation delay is exaggerated for the purposes of illustration. The voted macro sync output signal from the MS latch 84 on the line 88 of FIG. 2 is illustrated by waveform 88g of illustration (g) of FIG. 2a. It is shown delayed one clock pulse from the timing of wave form 88f. Thus, it will be seen that the voted macro sync signal on the line 88 is delayed by several clock pulses after the sync signal which causes the vote. For this reason, it is neccessary to cause the countdown chain 44 of FIG. 2 to begin its count, upon being reset by macro sync, several counts above zero depending on the number of clocked devices in the particular embodiment of the synchronizer. In the embodiment of FIG. 2, the macro sync signal on the line 88 occurs upon the instant that the third rising clock pulse edge occurs after the occurance of the falling edge of the sync signal that causes the vote. Thus, in illustration (h) of FIG. 2a is shown how the countdown chain 44 of FIG. 2 will be rezeroed upon receiving the macro sync signal on the line 88 of FIG. 2.

The signal on the line 88 of FIG. 2 may be routed to a synchronizer card edge connector (not shown) on a line 90 for external slaving purposes. If the CPU 54 is the only CPU in the channel, or if the CPU 54 is the master CPU in a multi-processor channel, the macro sync signal on the line 90 would be jumpered to the master CPU's MS signal on a line 92. This input signal on the line 92 is the macro sync signal that is used to synchronize the system, reset the rising and falling edge latches 32, 34, and also reset the countdown chain 44. The duration of the macro sync signal is dependent on when the Falling Edge Latches 34 are cleared. In this design the latches are cleared immediately by the macro sync signal on the line 42, thus removing the input to the disable gating 48, 70 and ultimately the voters 58, 82. When the next 800 KHz clock edge occurs, the macro sync latch 84 will be cleared (the voter output equals 0 and is clocked into the latch).

The countdown chain 44 is a binary coded decimal (BCD) divider chain made up of 4 BCD counters, which may be 54LS161 synchronous counters. The four counters are connected as a synchronous divider to produce an 80 Hz output from the 800 KHz clock by dividing by 10,000. The output of the divider chain is a sync signal on a line 100 that is provided to an AND gate 102. The counter output signal on the line 100 provides an 80% low - 20% high duty cycle required by the system. The macro sync pulse on the line 42 will preset the counter to its initial state, thus keeping each channel's counter in sync with the others. This method limits the timing skew in a frame to that of the system clock oscillator. It also prevents the time skew from accumulating due to the resynchronization at the end of each frame. The signal on line 100 is gated with a sync drive enable signal on line 104 from the sync enable latch 52. This signal is sent from the CPU 54 and is present unless the CPU determines that the synchronizer should be completely disabled. The AND gate 102 provides an output signal on a line 106 to a series of line drivers 108 that provide a buffered sync drive signal on lines 110 and the inverse on line 112 to all the other synchronizers in the system. Of course, all of the synchronizers each send similar signals to the other synchronizers in the system as mentioned previously in connection with the signals on the lines 23.

A vote window signal on the line 40 that enables the Rising Edge Latches 32 is also derived from the countdown chain circuitry 44. This is accomplished by gating several bits of the last counter in the chain. These are identified in FIG. 2 as signals on lines 114 which are provided to window circuitry (WC) 116, which in turn provides the enable signal on the line 40 in the presence of a window enable signal on a line 118. The window enable signal is provided by the latch 52 which in return is responsive to the CPU 54. In the embodiment of FIG. 2, the enable signal on the line 40 provides a signal that is active for 2.5 milliseconds about the expected rising edges of the other channels' sync pulses (1.25 ms on each side) when the system is in sync. The CPU can "open" the window during initial synchronization to speed up the synchronization process after power up. Otherwise, the initial synchronization process might take an unacceptably long period of time.

A fast clock detector 120 is a circuit that detects large pulse train timing variations in the individual channel's clock. The circuit is essentially a shift register which may be made of two 54LS74 type "D" Flip-Flops, that is clocked on the rising edge of the sync output on the line 100. The first bit of the shift register is cleared by the macro sync signal on the line 42. Thus, if two sync signal edges on the line 100 occur before the next macro sync signal pulse on the line 42, the bit is clocked into the second flip-Flop where it is latched until cleared by the CPU. The CPU is informed of the failure by an interrupt signal on a line 122. This signal is also provided to a buffer 124.

A Slow Clock Detector 126 is a retriggable one-shot that is set to produce a pulse that is 1.5 times the sync rate. The one-shot is continuously retriggered by the sync signal on line 100, keeping the one-shot's output low. If the sync signal is more than 1.5 times it nominal frequency, the one-shot times out, producing a high level at its output on a line 128. This edge is used to indicate the loss of clock or a slow clock. The CPU is informed of the failure by an interrupt.

In a gate array embodiment of the invention, the slow and fast clock detectors 126, 120 are embodied in a fast/slow clock detector which is a counter that is preset by the falling edge of the sync drive signal on the line 100. The counter is clocked by a clock that is independent of that used to derive the synchronizer timing. The outputs of the counter are decoded to provide a window around the time that the falling edge of the sync signal is expected to occur. If the sync signal does not occur in the window, the CPU is informed via an interrupt. A fast clock flag is set if the edge occurs before the window, and a slow clock flag is set if the edge occurs after the window or does not occur at all.

Figure 3:
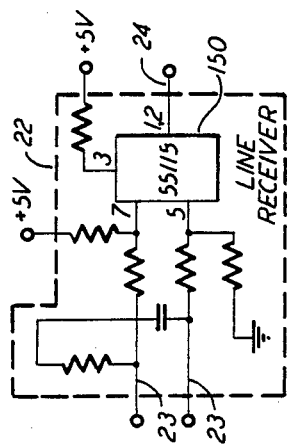
FIG. 3 is a simplified schematic block diagram showing a line receiver of FIG. 2 in more detail.

FIG. 3 is a schematic block diagram of one of the line receivers 22 of FIG. 2. Differential signals on the line 23 are sensed by one of the dual differential line receivers 150 in a type 55115 package. The line receiver 22 provides the output signal on the line 24. It should be understood that although a very detailed schematic diagram of a line receiver 22 has been provided, the practice of the invention is not restricted to the exact circuitry shown.

FIG. 4 is a schematic block diagram illustration of the input latches 26 of FIG. 2. Output signals on the lines 24 are received from each of the line receivers 22 and each is provided to a separate D-type flip-flop in an LS174 hex D-type flip-flop package. The clock signal on the line 30 is provided from the 800 KHz clock 28 of FIG. 2. A POR signal on a line 152 (not shown in FIG. 2) is provided to the clear input of the hex flip-flop 151. A second hex flip-flop 153 is provided within the input latch 26 to provide further buffering. The input latch provides buffered output signals on the lines 36, 38 as shown in FIG. 2 to the rising edge latches 32 and the falling edge latches 34 respectively.

Figure 5:
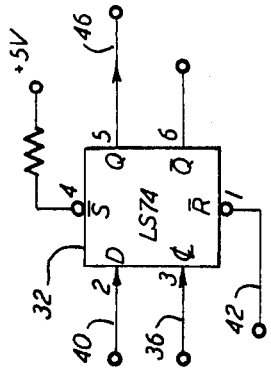
FIG. 5 is a simplified schematic diagram of one of the rising edge latches of FIG. 2.

FIG. 5 is an illustration of a typical Rising Edge Latch 36. In the embodiment of FIG. 2, there would be N such latches. Each latch may be one of the dual D-type positive-edge-triggered flip-flops in a LS74 type package. Thus, three such packages would be used in the rising edge latch 36 of a six input system. Each individual flip-flop is cleared by the synchronizer's macro sync signal on the line 42. Each flip-flop is enabled at the D input by the signal on the line 40 from the countdown chain 44 of FIG. 2. After the D input is enabled, a clock input on the line 36 from the input latches 26 causes the output on the line 46 (to disable gating 48 of FIG. 2) to go high.

The disable gating 48 is shown in more detail in FIG. 7 as one gate in an LS08 quad-AND gate 48. The Q output on the line 46 from the rising edge latches 32 of FIG. 5 are individually input to associated AND gates similar to the gate pictured in FIG. 7. There they are gated with enable signals similar to the signal on the line 50 which permit the sync drive signals to be propagated on the line 56 to Voter No. 1 58.

FIG. 6 is an illustration of one of the falling edge latches 34 which is identical to the Rising Edge Latch shown in FIG. 5 except that in an inverter 160 is interposed between the input signal on the line 38 and the latch 34. This makes the latch sensitive to the falling edges of the input signals rather than the rising edges as in FIG. 5. In the case of the falling edge latches 34, the enable signal is not from the countdown chain as in FIG. 5, but originates in the MS arm latch 64 (see FIG. 2) and is designated by a line 66 and is provided to the Falling Edge Latches after a vote has taken place in Voter No. 1 58.

The MS arm latch 64 is shown in more detail in FIG. 9. It may be one half of a dual D-type positive-edge-triggered flip-flop of the LS74 packaged type. A voted signal on the line 62 from Voter No. 1 is provided to the D input of the latch 64. The latch 64 provides an output signal on the line 66 to the falling edge latches 34 after receiving a voted signal and being clocked by the signal on the line 30. The latch is preset by the macro sync signal on the line 42.

FIG. 10 is an illustration of the MS latch 84 of FIG. 2. It may be one half of a dual D-type positive-edge-triggered flip-flop of the LS74 packaged type. The latch 84 responds to a clock signal on the line 30 from the 800 KHz clock 28 of FIG. 2 and a voted signal from Voter No. 2 on the line 86. It provides a macro sync output signal on the line 88 in response to the voted signal on the line 86.

FIG. 8 is an illustration of Voter No. 1 58. Input lines 56 from the disable gating 48 are shown as inputs to a 4-bit binary full adder 168 (with fast carry) of the LS283 packaged type. An additional LS283 4-bit binary full adder 170 is coupled with the adder 168 to provide a ones adder whos output is the number of inputs that are at a logic "1". The outputs are connected to a comparator 172 that produces an output if the number from the ones adder is greater than the number programmed by the CPU and provided to the comparator 172 on the lines 60. The comparator 172 produces an output if the number from the adder is greater than number programmed by the CPU. The input from the CPU is a two bit input on lines 174, 176 and allows voting on the first sync edge detected or on up to 4 of 6 edges. The comparator output on the lines 62 is clocked into the D input of the MS arm latch 64 of FIG. 9 to indicate that a vote has taken place. The Voter No. 2 82 of FIG. 2 is very similar to the voter of FIG. 8 and will not be discribed in detail.

Figures 11, 12, 13:
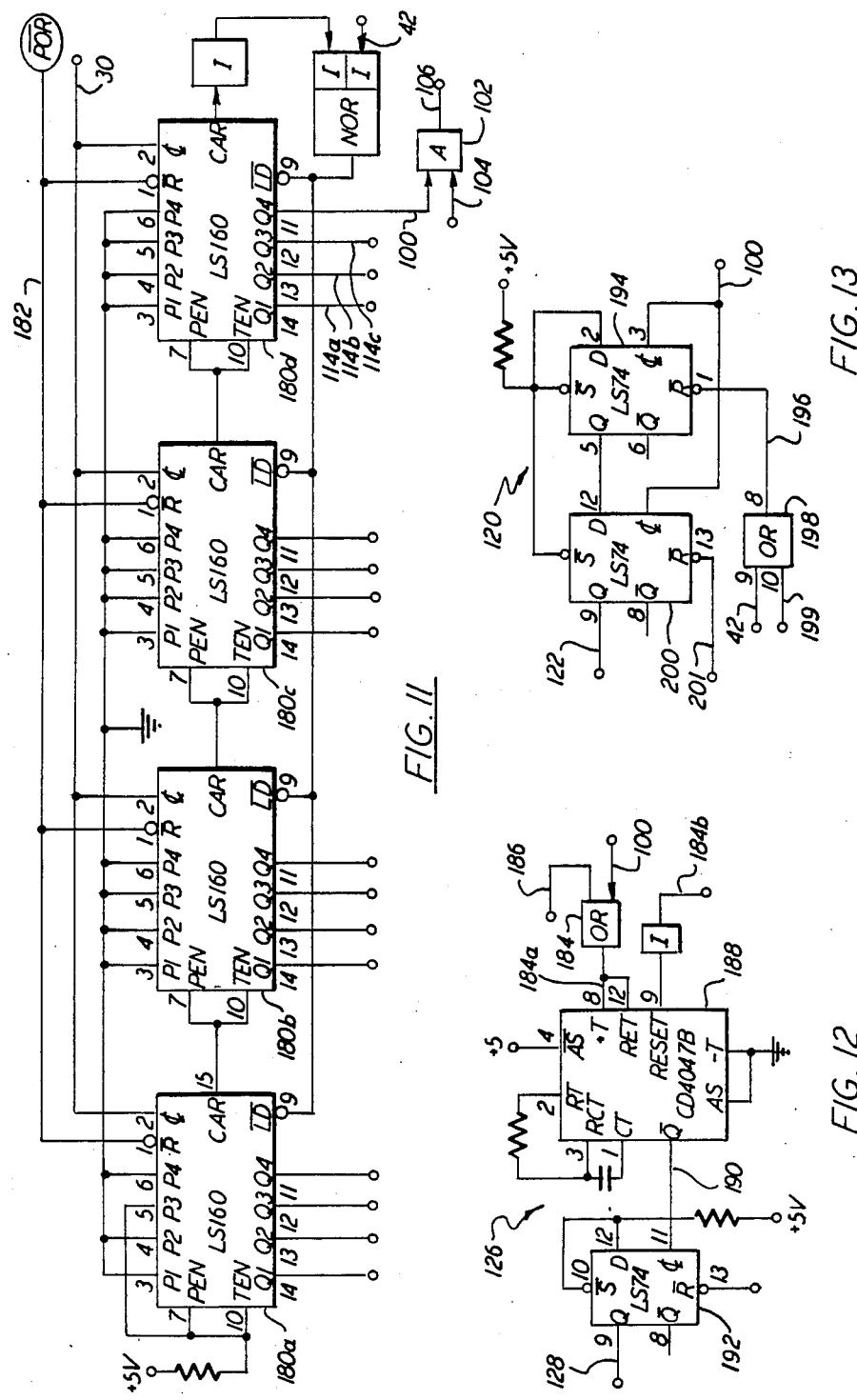

FIG. 11 is a schematic block diagram of the countdown chain 44 of FIG. 2. It may be constructed of 4 synchronous 4-bit BCD counters 180a, 180b, 180c, 180d of the LS160 packaged type. A POR signal on a line 182 (not shown in FIG. 2) is provided to each of the counters' clear inputs. Each of the counters is clocked by the 800 KHz signal on the line 30 and these pulses are counted by the countdown chain. The output signal on the line 100 is provided to the AND gate 102 where it is gated with the sync enable signal on the line 104. If the sync drive signals are enabled by the signal on the line 104, the AND gate 104 provides the sync drive signal on the line 106 to the drivers 108 of FIG. 2. The line drivers 108 of FIG. 2 may be dual differential line drivers of the 55114 type and will not be shown in detail.

Figure 11A:
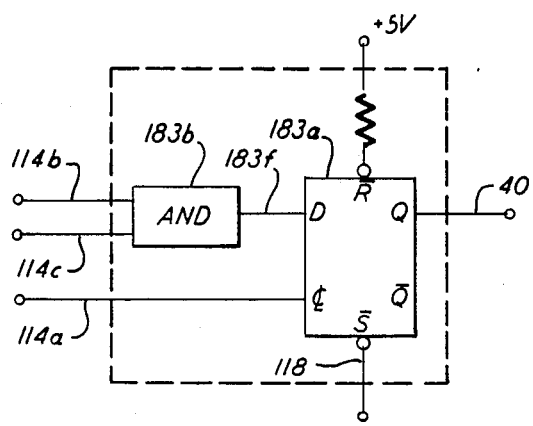
FIG. 11a is a simplified schematic diagram of the window circuitry of FIG. 2.

FIG. 11 shows the most significant BCD counter 180d providing its 3 least significant output bits (Q1, Q2, Q3) on output lines 114a, 114b, 114c. These outputs are provided to the window circuitry 116 of FIG. 2. FIG. 11a illustrates the window circuitry 116 of FIG. 2 in more detail. The least significant bit of the BCD counter 180d is fed, on the line 114a, to the clock input of a D Flip-flop 183a. The next two least significant bits are provided on lines 114b, 114c to an AND gate 183b. The window circuitry provides an arm window during 20% of each frame during a time interval illustrated in FIG. 11b.

Figure 11B:
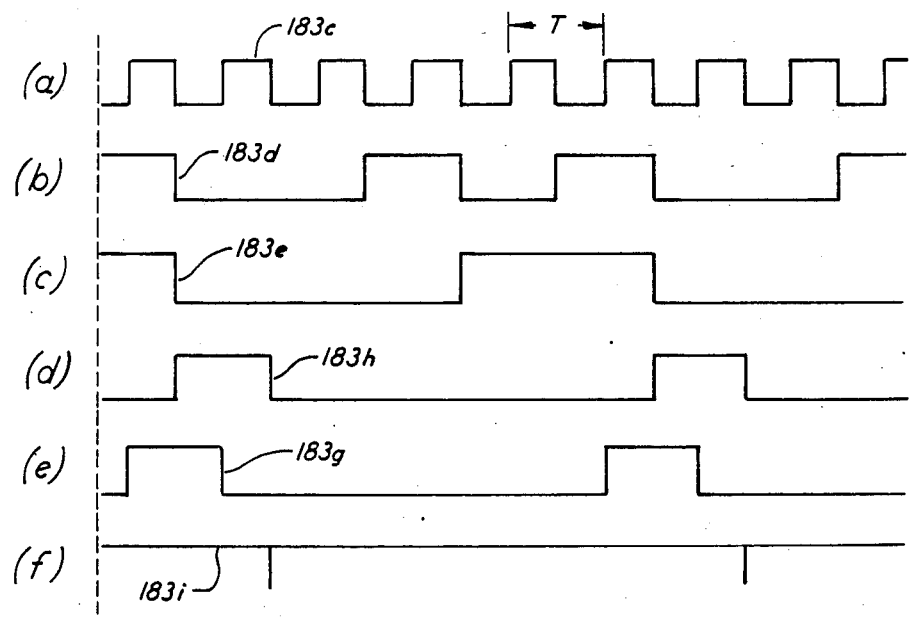
FIG. 11b is a timing diagram illustrative of some of the signals of FIGS. 2 & 11.

Illustration (a) of FIG. 11b shows a waveform 183c illustrative of the count signal provided on the line 114a of FIG. 11. The period (T) of this signal is $2\frac{1}{2}$ milliseconds. Illustration (b) of FIG. 11b shows a waveform 183d illustrative of the count from the Q2 bit on line 114b of FIGS. 11 & 11a. Illustration (c) of FIG. 11b shows a waveform 183e illustrative of the Q3 bit of the BCD counter 180d of FIG. 11. This bit is presented on line 114c to the AND gate 183b of FIG. 11a. The AND gate 183b output on a line 183f is presented to the D input of flip-flop 183a. Since the state of the D input at the instant the clock line goes positive determines the state of the Q output on the line 40, the output waveform 183g shown in FIG. 11b, illustration (e), will be high when the waveforms 183d, 183e are high at the time that the clock wave form 183c goes high and will stay that way until the next clock rising edge occurs (since both waveforms 183d and 183e will have gone low by then). For this application, it will be seen that the arm signal on the line 40 of FIG. 2 & 11a, as illustrated by waveform 183g of illustration (e) of FIG. 11b, will remain high for 2½ milliseconds of a 12 millisecond period. In other words, the arm signal on the line 40 has a 20 percent high-80 percent low duty cycle. The high portion lasts for 2½ milliseconds and is centered about the rising edge of its own sync signal as illustrated by waveform 183h of illustration (d) of FIG. 11b. This waveform 183h is illustrative of the signal on the line 100 of FIGS. 11 & 2. It is the sync output signal for the particular synchronizer. Thus, it will be seen that the synchronizer is armed only during a brief 2½ millisecond period during each 12 millisecond frame. The timing of the arm period is designed to be centered equally on either side of the expected sync signal on the line 100 as illustrated by wave form 183h. The final waveform 183(i) of FIG. 11b as shown in illustration (f) is illustrative of the macro sync signal on the line 42 of FIGS. 2, 5, 6, 9, & 11. It is shown as a narrow spike in illustration (f) since it is only on the order of 1.25 microseconds long. It will normally occur about 3 clock pulses after the falling edge of the sync signal that causes the vote. This is due to the number of clocked devices shown in this embodiment between the incoming sync signals and the outgoing macro sync signals. Of course, since the clock signal in this embodiment is running at 800 KHz the time interval between the falling edge of waveform 183h and the macro sync pulse of wave form 183i cannot be shown in FIG. 11b because of the scale differences involved.

FIG. 12 is an illustration of one implementation of the slow clock detector 126 of FIG. 2. Clock pulses on the line 100 are provided to an input of an OR gate 184 which provides an output signal on a line 184a if either a clock pulse on the line 100 or a slow clock test pulse on a line 186 (not shown in FIG. 2) is present. The OR gate output on the line 184a is presented to a re-triggerable one-shot 188 which provides an output on a line 190 to a D flip-flop 192 which in turn provides the slow clock interrupt signal on the line 128 to the CPU 54 of FIG. 2.

FIG. 13 is a schematic block diagram illustration of one implementation of the fast clock detector 120 of FIG. 2. It includes a pair of D type flip-flops 194, 200 responsive to the output on the line 100 of the countdown chain 44 of FIG. 2. One of the flip-flops 194 is cleared by a signal on line 196 from an OR gate 198. The OR gate 198 is responsive to either a macro Sync signal on the line 42 or fast clock test signal on a line 199. The second flip-flop 200 is cleared by a reset clock fail signal on line 201 (not shown in FIG. 2) and provides the fast clock interrupt signal on the line 122 to the CPU 54 of FIG. 2.

It should be understood that all of the detailed circuitry disclosed in FIGS. 3–13 are merely representative of one implementation of the block diagram of FIG. 2. Many different variations of such circuitry are capable of being designed by those skilled in the art of Electronics Design.

Similarly, it should be understood that the block diagram of FIG. 2 is not neccessarily the only block diagram with which may be drawn to represent a Best Mode Embodiment of the invention. For example, FIG. 14 is a simplified schematic block diagram of another embodiment of the synchronizer 10 of FIG. 1, accoring to the present invention.

Figure 14A:
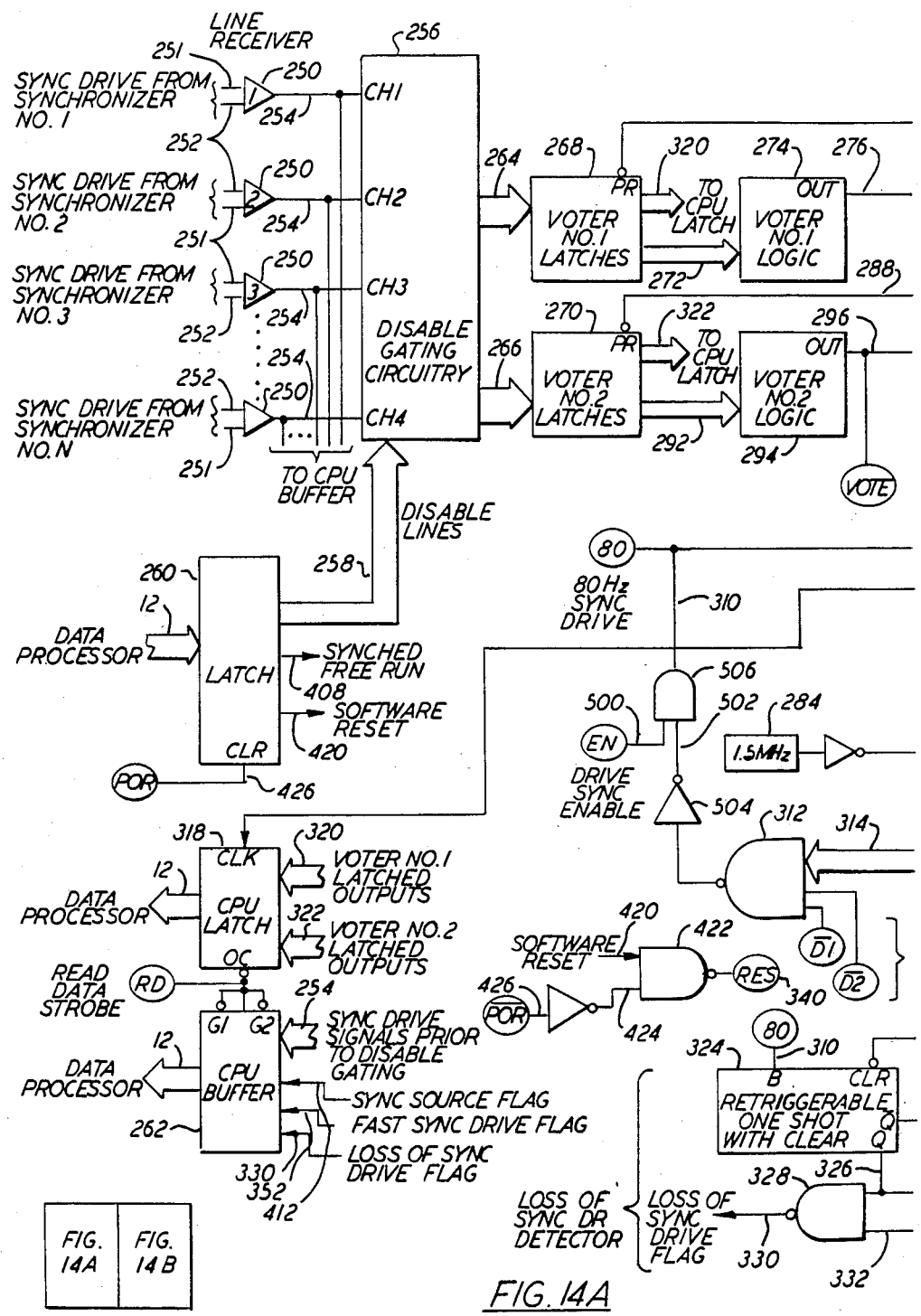
Figure 14B:
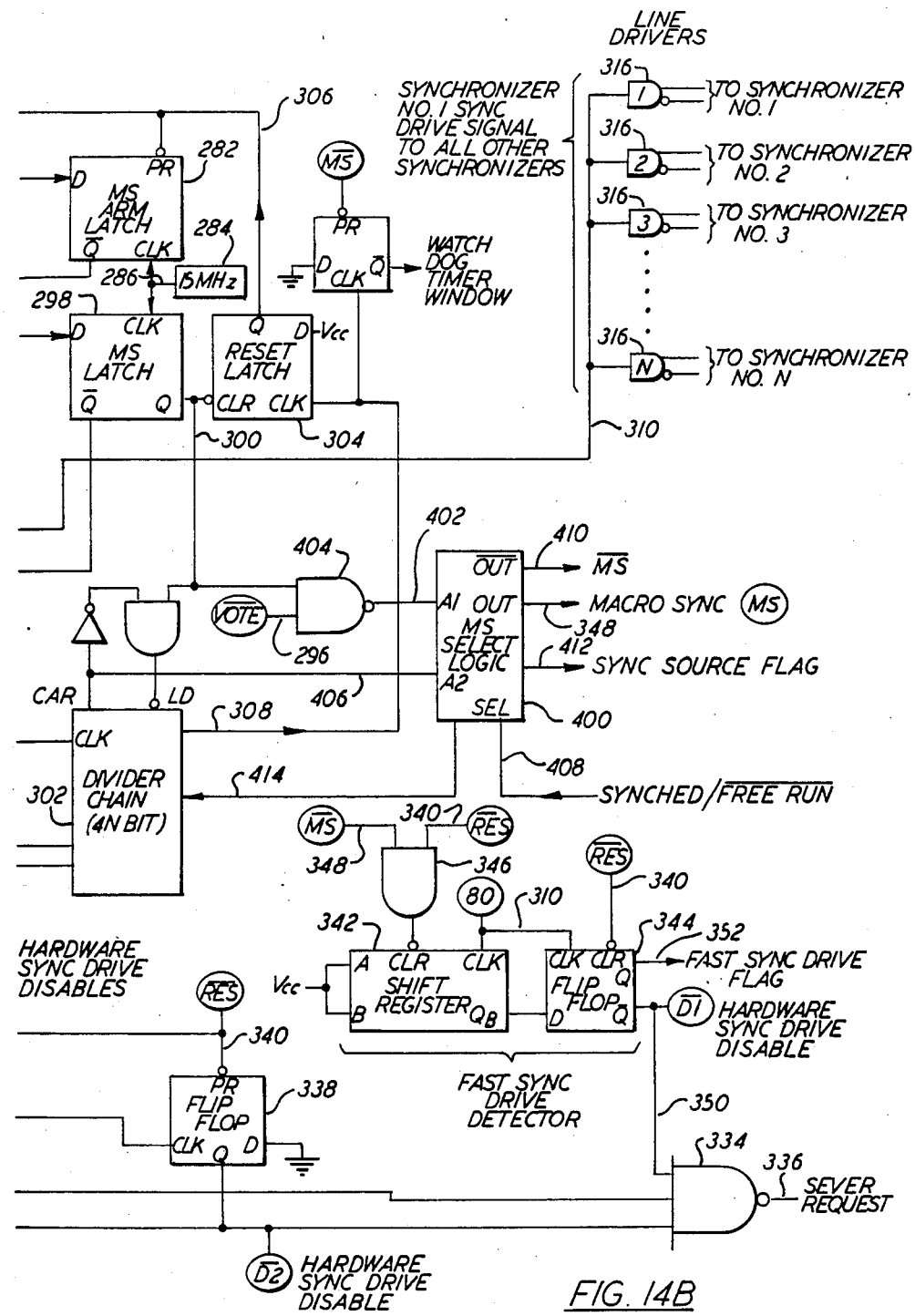

The synchronizer of FIG. 14 includes line receivers 250 which may be type SN55115 dual differential line receivers. The line receivers convert a differential 5 volt sync signal on lines 251, 252 to a TTL compatible 0–5 volt signal on lines 254. The inputs to the receivers 250 are biased (not shown) such that removal of power from a line driver, and open on both inputs, or shorted input will cause a stable ouput state on the affected line receiver's output.

FIG. 14, in a manner similar to FIG. 2, shows "N" differential sync drive signals received from "N" synchronizers. Although the number of sync drive inputs from the various synchronizers in the system theoretically unlimited, in practice the number of sync drive inputs which a given modular synchronizer may accept would normally be limited to approximately six. Systems that require a larger number of synchronizers can piggyback the modular units in a manner to be discussed in detail below. However, it should be understood that the number of sync drive inputs to a synchronizer could be greater or less than six by any number.

The incoming sync drive signals are gated in disable gating circuitry 256 with an enable level on lines 258 from a latch 260 interfacing with the particular data processor 14 associated with the particular synchronizer 10 (see FIG. 1). The gating is set up so that there will never be a low to high transition at the output at the time a given sync drive signal is disabled. This prevents the disable from being latched as a valid sync drive signal and affecting the voting circuitry. The sync drive input signal on the lines 254 are applied to the data processor through a CPU buffer 262 which may be a register containing D-type flip-flops with totum-pole tri-state outputs capable of driving highly capacitive or low impedance loads.

Figure 15:
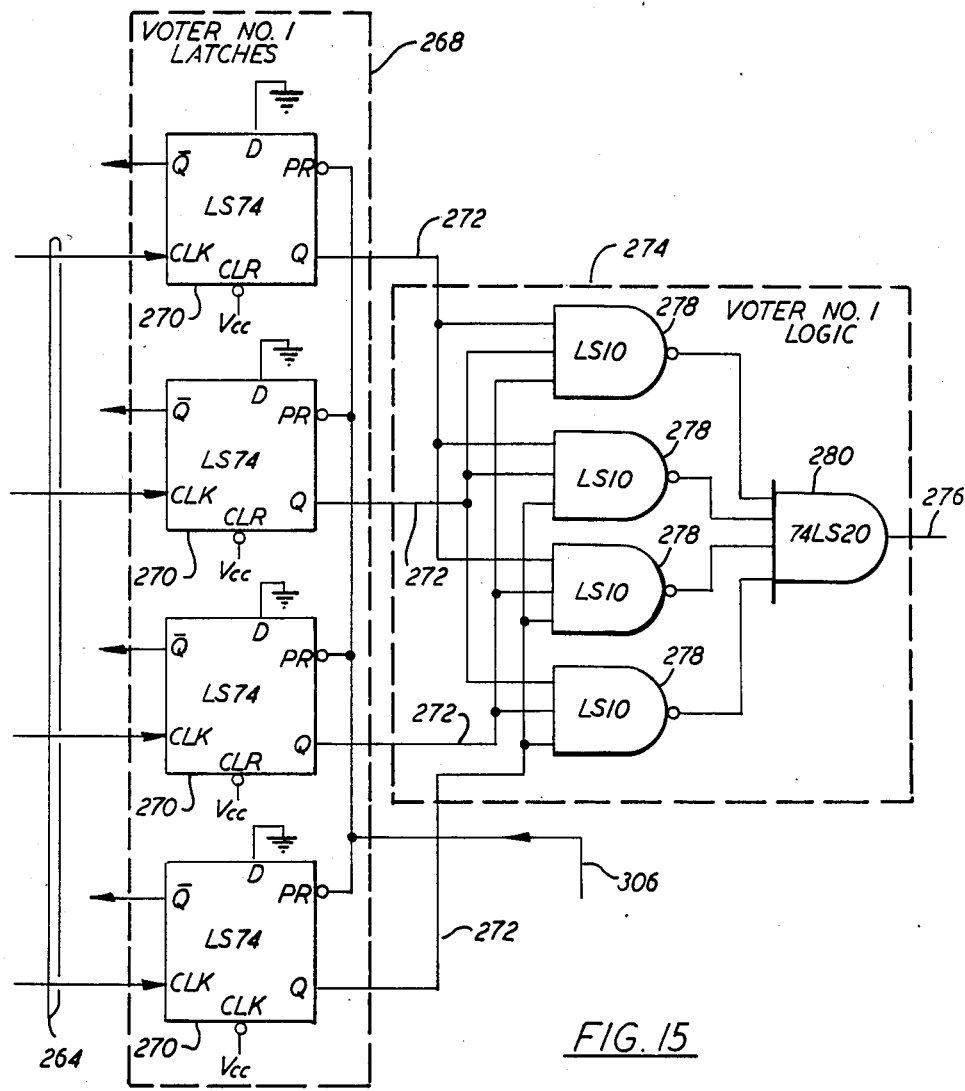
FIG. 15 is a simplified schematic block diagram showing the Voter No.1 latches and the voter No. 1 logic of FIG. 14 in more detail.

Each of the non-disabled sync drive signals on the lines 254 are provided by the disable gating circuitry 256 on lines 264, 266 to Voter No. 1 rising edge latches 268 and to Voter No. 2 falling edge latches 270, respectively. The Voter No. 1 rising edge latches 268 are shown, for a 4-input (N=4) synchronizer, in FIG. 15. In the particular application of FIG. 15 the latches are shown as dual D positive-edge-triggered flip-flops, e.g., 74LS74. As shown in FIG. 15, the individual sync drive signals on the lines 264 from the disable gating circuitry 256 (see FIG. 14) are used as individual clocks in individual flip-flops 270.

The sync drive signals from each of the individual synchronizers could have, for example, a duty cycle of 20 percent high and 80 percent low. Similarly, in the embodiment illustrated in FIG. 14, each of the sync drive signals could have a frequency of 80 hertz. The voting circuit (to be discribed below) is used in the embodiment of FIG. 14, to detect the presence of two or more of four rising sync drive transitions. The occurrence of a transition on any of the 4 clock inputs is latched in an associated one of the D-type flip-flops.

Referring back to FIG. 14, the outputs of the Voter No. 1 latches 268 on lines 272 are presented to a Voter No. 1 logic circuit 274 whose output signal on a line 276 is low when at least two of the input signals on the lines 272 are low. Referring back to FIG. 15, the Voter No. 1 logic 274 as may be embodied in a synchronizer having inputs from four synchronizers is shown. The Voter No. 1 logic may be implemented using a combination of triple 3-input NAND gates 278, e.g., a 74LS10 and a dual 4-input NAND gate 280, e.g., a type 74LS20 package, as shown.

Figure 16:
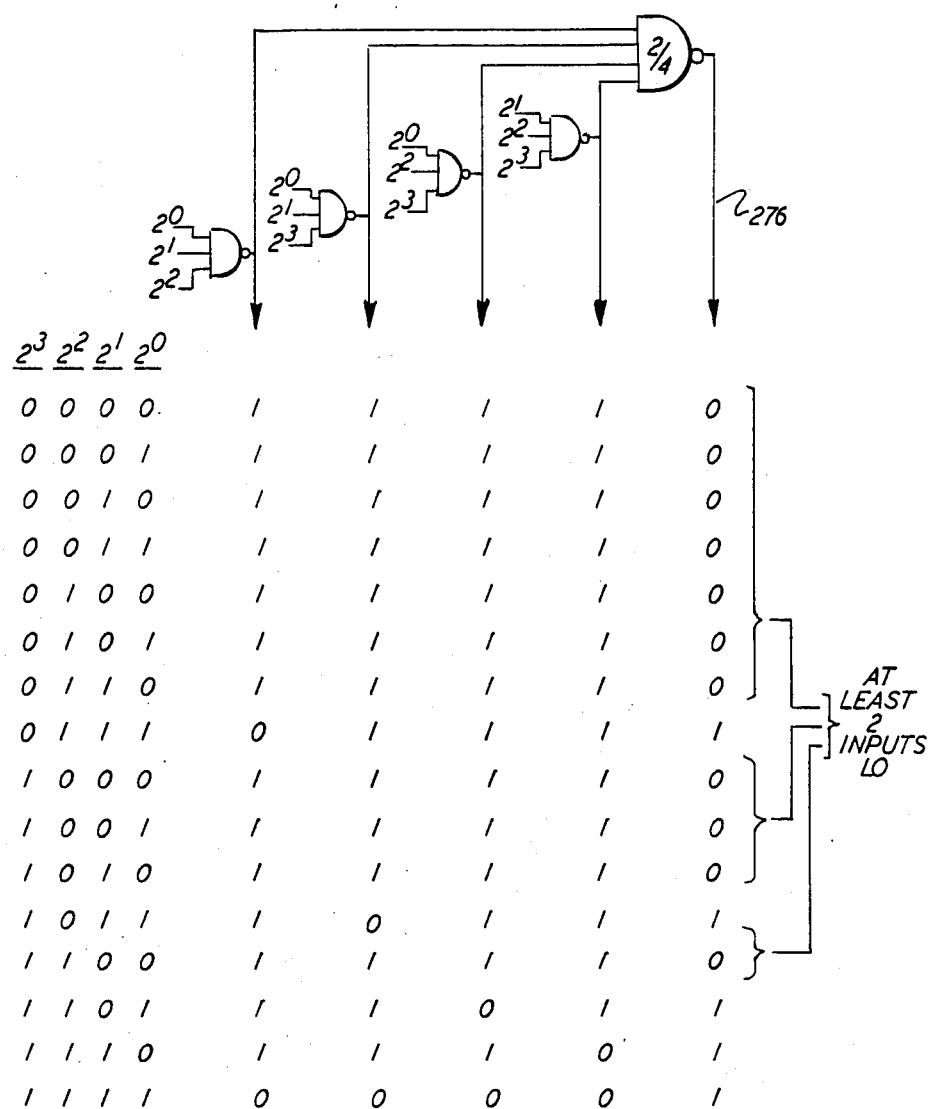
FIG. 16 is a truth table showing all the possibilities for output for all possible inputs to the logic of FIG. 15.

The truth table as shown in FIG. 16 for the logic of Voter No. 1 logic produces a low output whenever at least two of the voter inputs are low. Thus, Voter No. 1 may be described as a two-out-of-four voter. In other words, if two out of the four synchronizers in the system contemplated in FIG. 1 (N=4) are operable, the synchronizer produces a "voted output" signal on the line 276 (see FIGS. 14, 15, & 16).

It should be understood that the voter architectures shown in FIGS. 8 and 15 for the synchronizers of FIGS. 2 and 14 are not the only architectures that could be used. For example, with slight modifications, the voter of FIG. 8 could employ a magnitude comparator, e.g., a SN5485 in lieu of the logic shown in FIG. 8. Many other implementation of the voter are also possible.

Referring back to FIG. 14, the voted output signal on the line 276 is then latched into an MS arm latch 282 by a system clock 284 which provides a 1.5 megahertz signal on a line 286. An MS arm signal on a line 288 enables the Voter No. 2 falling edge latches 270. The second voting circuit is functionally the same as that of Voter No. 1. The sync drive signals on the lines 266 applied to the Voter No. 2 latches 270 are inverted sync drive signals or they may be inverted functionally within the block indicated as Voter No. 2 latches 270. This inversion is done in order to allow rising edge latches to latch the falling edge of the sync drive pulses. The outputs of the Voter No. 2 falling edge latches 270 are provided on lines 292 to Voter No. 2. logic 294. When at least two falling edges have been latched, the Voter No. 2 logic 294 provides an output signal on a line 296 which goes to a low level. The voted signal on the line 296 is designated, in FIG. 14, as VOTE. The voted signal on the line 296 is clocked into an MS latch circuit 298 by the 1.5 megahertz system clock 284. An MS latch output signal on a line 300 is then used to preset a divider chain 302 to its initial count and is also used to clear a reset latch 304. The Q output of the reset latch 304 on a line 306 is used to disable any further voting until a "1" is clocked into the reset latch 304 by a transition on its clock (CLK) input. The disable time is determined by the divider chain 302 output on a line 308 that is connected to the clock input of the reset latch 304. The resetting of the voter circuitry causes a "0" to be shifted into the MS latch 298 on the next clock cycle. This determines the voted frame sync or the "macro sync" pulse width.

It should be understood that although the disable gating circuitry 256 is shown in FIG. 14 between the line receivers 250 and the voter latches 268, 270, the disable gating circuitry 256 could also have been placed between the voter latches 268, 290 and the voter logic 274, 294, as in FIG. 2. The synchronizer of FIG. 2 is synchronized to the local channel's clock oscillator while the synchronizer of FIG. 14 is essentially free running, thereby providing a much tighter frame synchronization between the units. The time skew between the various synchronizers based on FIG. 14 is only dependent on the gate delay differences from synchronizer to synchronizer and is independent of clock skews. It should also be noted at this time that numerous other changes of this kind may be made in the synchronizer architecture in implementing the inventive concept disclosed herein, as exemplified by the two very different architectures shown in FIGS. 2 & 14.

Figure 17:
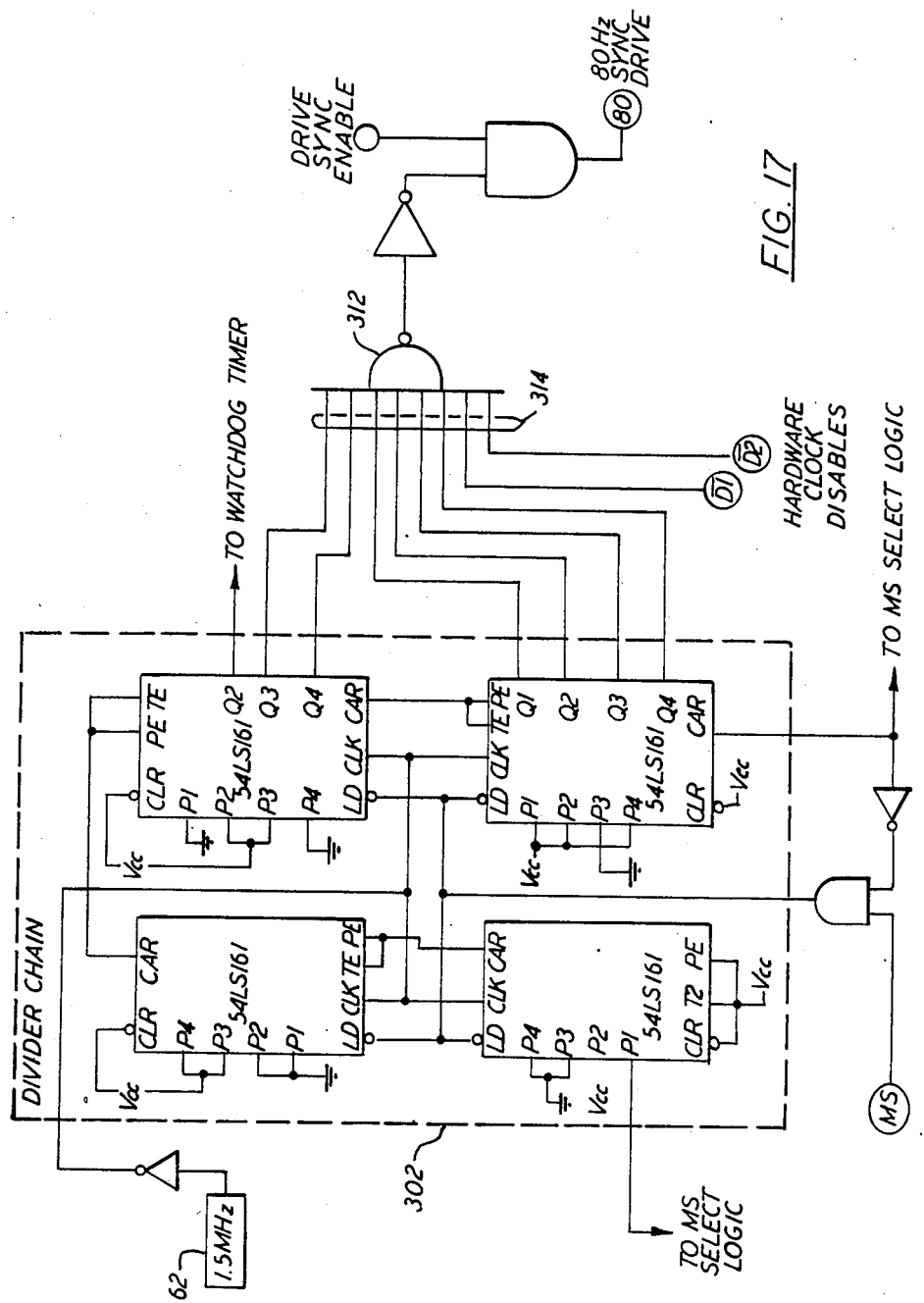
FIG. 17 is a simplified schematic diagram of the divider chain of FIG. 14.

Referring back to FIG. 14, the divider chain 302 is used to generate an 80 hertz sync drive signal on a line 310. The divider chain 302 counts clock pulses generated by the system clock 284. In the embodiment of FIG. 14 a 1.5 megahertz clock is used, although another frequency could as easily have been chosen. The dividers used may be 54LS161 synchronous counters as shown in FIG. 17. The duty cycle of the 80 hertz sync drive is determined in FIG. 17 by a 54LS30 NAND gate 312 connected at the inputs thereof, in the particular embodiment of FIG. 17, to bits 10–16, designated by a line 314 in FIG. 14, of the divider chain. The resulting duty cycle is, in the particular case, 94.5% low/5.5% high. The counters of FIG. 17 are preset to divide by 18,750. If a counter in a particular synchronizer in a four synchronizer system reaches its maximum count, it "rolls over" by being preset to a given number. The two counters that caused the voted "macro sync" signal to be generated are therefore ahead of the other counters in the remaining two synchronizers (assuming a two of four voter). To achieve system synchronization, the macro sync pulse is used to preset the counters in all of the synchronizers to the same start count. Therefore, the two counters that caused the vote must be preset twice. The slower channels' counters get preset once.

Referring again to FIG. 14, output line drivers 316, which maybe SN55114 dual differential line drivers that are fully compatible with the SN55115 line receivers 250 and the input biasing used, are used to send the synchronizer's output sync drive signal, in this case synchronizer No. 1, to each of the other synchronizers' in the system. FIG. 14 shows that the total number of synchronizers is not limited by indicating that the last synchronizer to be sent a sync drive signal is a variable numbered "N". For puposes of describing the embodiment of FIG. 14, however, a system using four synchronizers will continue to be described, as before.

The data processors 14 of FIG. 1 interact with the synchronizers 10 on the lines 12 and are shown in FIG. 14 for purposes of illustrating a particular data processor 14 interacting with the synchronizer of FIG. 14. Thus, the lines 12 from the particular data processor 14 associated with the synchronizer of FIG. 14 are shown entering the latch 260, exiting a CPU latch 318, and exiting the CPU buffer 262. The CPU latch 318 receives latched outputs from Voter No. 1 on lines 320 and latched outputs from Voter No. 2 on lines 322. The latched outputs of Voters 1 & 2 on the lines 320, 322 are made available to the data processor in order that the processor may verify that a particular synchronizer's sync drive signal has been disabled in accordance with a disable command on one of the lines 258 provided by the latch 260 to the disable gating circuitry 256. The sync drive signals on the lines 254, as previously described, are provided to the CPU buffer 262 for transmission on the lines 12 to the data processor which evaluates the "health" of the individual synchronizers. The latch 260 may be an octal latch or a similar device. The CPU latch 318 may also be in octal latch and is used to check which synchronizers are "alive" and which were involved in the vote. This is done by latching the outputs of the rising and falling edge flip-flops at the time of the macro sync pulse. Finally, the CPU buffer 262, as previously described, may be a tri-state buffer.

A loss of sync drive detector may include a re-triggerable one shot 324 that is set up to provide an output pulse of 20 milliseconds. The 80 hertz sync drive pulses on the line 310 are used to trigger the one shot 324. Since the period of the 80 hertz sync drive signal is 12.5 ms, the one shot should remain triggered unless a sync drive pulse is missed. In that event, the one shot will time out and a loss of sync signal on a line 326 is provided to a NAND gate 328 which provides a loss of sync drive flag signal on a line 330 in the presence of both an ouput signal on the line 326 and a hardware sync drive disable signal on a line 332. Of course, it should be understood that the particular timing involved in the particular embodiment of FIG. 14 would change under a different design.

Upon initialization when power is first applied, the one shot 324 is cleared. The Q output signal on the line 326 is gated in a NAND gate 334 to produce a channel severe request on a line 336 during reset. When the first 80 hertz sync drive pulse rising edge triggers the one shot 324, the Q output becomes a "1". The one shot's Q output is used to clock a D flip-flop 338. This flip-flop's Q output is a "1" during reset, and is set to "0" if the one-shot times out. The flip-flop's output on the line 332 is used to disable the internal 80 hertz sync drive signal and to generate a channel severe request. The flip-flop 338 can only be cleared by a reset on a line 340, and the output is readable by the CPU through the CPU buffer 262.

A fast sync drive detector is made up of a dual four bit shift register 342 such as an LS164. The first half of the shift register is used to count the 80 hertz sync drive pulses on the line 310. The second half is used as a latch 344. Both shift registers are cleared during reset. The latch 344 receives a reset signal on the line 340 directly while the shift register 342 receives the same reset signal only after gating in an AND gate 346 with the macro sync signal on a line 348. If the sync drive pulse is normal, the MS pulse on the line 348 will permit the reset signal on the line 340 to clear the first shift register 342 before the "1" reaches the second shift register 344. If the "1" reaches the second shift register 344, the Q output on a line 350 is used to generate a sever request on the line 336 through NAND gate 334 provided a hardware sync drive disable signal (D1) on the line 350 is present. The Q output on a line 352 is designated the fast sync drive flag and is readable by the CPU through CPU buffer 262.

MS select logic 400 receives a gated macro sync signal on a line 402 from a NAND gate 404 which performs a gating function on the macro sync signal 300 and the voted output signal on the line 296 from Voter No. 2 logic 294. The NAND gate 404 is provided in order to insure that the leading edge of the vote is concurrent in all channels. The MS select logic 400 receives a carry bit signal on a line 406 from the divider chain 302. The MS select logic 400 is also responsive to a SYNCHED/FREE RUN signal on a line 408 from the latch 260. The MS select logic 400 provides the macro sync signal on the line 348, and MS signal on a line 410, a sync source flag signal on a line 412, and a signal on a line 414 to the divider chain 302 indicative of whether the divider chain should divide the system clock pulses by 18,750 or 18,749.

A software reset signal from the data processor is provided by the latch 260 on a line 420 to a NAND gate 422 which gate the software reset signal on the line 420 with an inverted POR signal on a line 424. The POR signal on a line 426 is a power on reset signal. The POR signal on the line 426 is also used to clear the latch 260 so all sync inputs are disabled on power on to prevent spurious interrupts during power up.

The SYNCHED/FREE RUN signal on the line 408 is provided by the latch 260 for use by the MS select logic 400. The sync source flag signal on the line 412 from the MS select logic 400 is utilized by and provided to the data processor by the CPU buffer 262 on the lines 12.

The fast sync and loss of sync drive flags on the lines 352, 330 are similarly provided through the CPU buffer 262 to the data processor on the lines 12. The function of the fast sync and loss of sync drive flags in the data processor is to inform the CPU of synchronizer failure.

The hardware sync drive disable signal on the line 350 is generated by the CPU via a latched data bit and disables the sync drive to the other channels in the event of synchronizer problems in its own channel.

A sync drive enable signal on a line 500 is gated with a signal on line 502 from an inverter 504 in an AND gate 506 which provides the synchronizer's 80 hertz sync drive signal on the line 310. The function of the sync drive enable is to permit the synchronizer to send out a drive sync signal when all indications are that the synchronizer is functioning properly.

Figure 18:
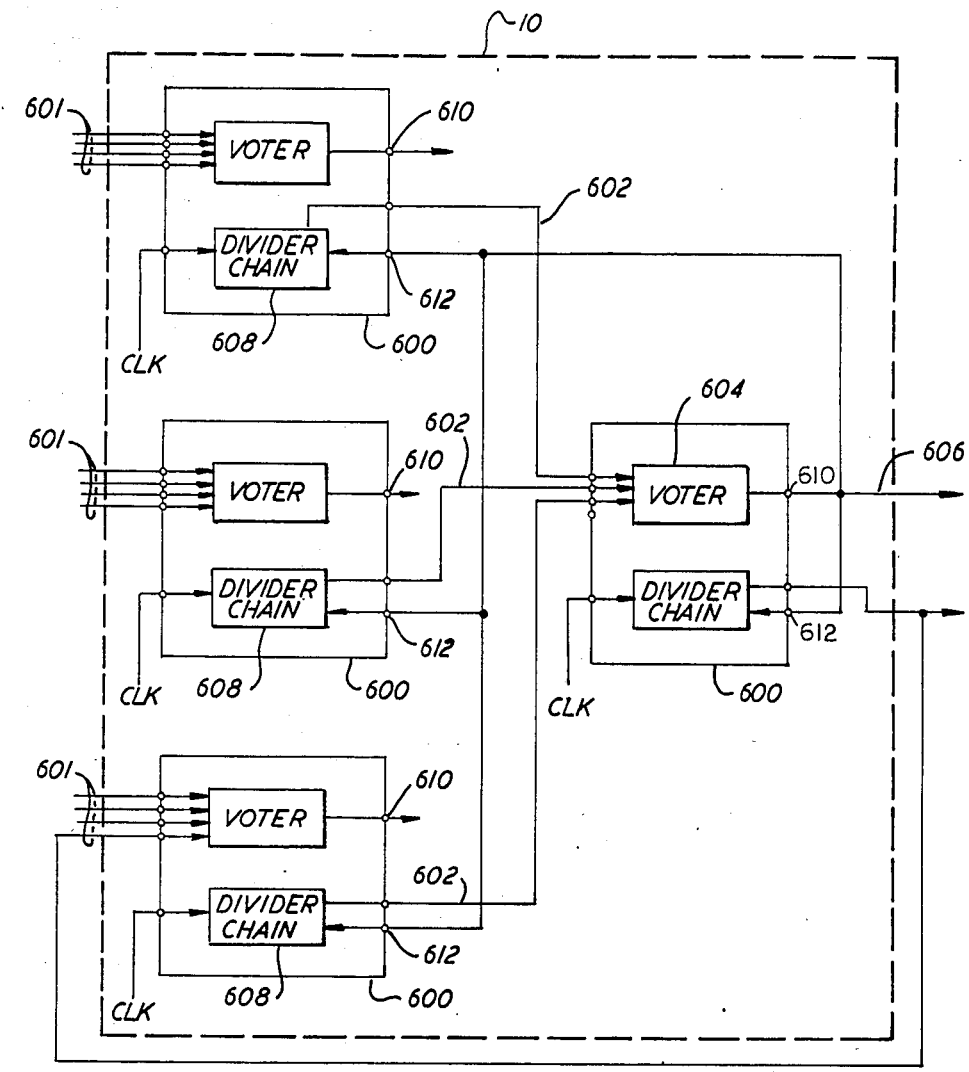
FIG. 18 is a simplified schematic block diagram of a synchronizer according to the present invention as utilized in a system similar to that shown in FIG. 1 where N is equal to twelve.

Referring to FIG. 18, a 12 input synchronizer 10 according to the present invention as shown in FIG. 1, (N=12), is illustrated for use in a system having 12 similar synchronizers 10. Assuming that forty-eight modular synchronizers 600, each having the capability of accepting inputs from four other synchronizers are available, it is possible to construct a system similar to the four synchronizer system illustrated above in FIGS. 14–17. Three of the synchronizers 600 are used in each of the twelve units' synchronizers 10 to receive sync drive signals 601 from the other eleven synchronizers and from itself. The remaining synchronizer in each unit is used to receive sync drive (counter output) signals on lines 602 which are voted upon in a voter 604. The resulting voted outut signal on a line 606 constitutes the voted output signal for that synchronizer 10 and it is utilized as well internally to reset each of the divider chains 608 within each synchronizer 600.

Modularity is further enhanced by providing each synchronizer 600 with an output port 610 for routing its macro sync signal externally. Each synchronizer is also provided with an input port 612 which may be hooked up to receive a macro sync signal from any one of the synchronizers in the system, including itself.

Thus, it will be seen that the present invention is capable of great versatility due to a modularity concept shown in FIG. 18. Similarly, although two embodiments of the invention have been described above and illustrate very specific types of electronic circuits including specific shift registers, gates, latches, buffers, etc., it should be understood by those skilled in the art that the teachings of the invention may be practiced in a wide variety of other synchronizer embodiments of the present invention. As an example, the synchronizer of the present invention has been successfully embodied in a gate array design employing typical gate array circuitry. I. e., in the gate array the circuitry is very different from the embodiments above. However, although the teachings of the invention are implemented using gate array technology, the inventive concepts are the same. Therefore, the gate array embodiment will not be presented herein.

In addition, it will be obvious to those skilled in the art that various modifications and variations may be made to the perferred embodiments shown herein without departing from the spirit and scope of the invention as defined in the appended claims.

We claim:

1. A synchronizer for use in a multi-channel system, each channel having an oscillator and a synchronizer associated therewith, the oscillator for providing clock pulse signals at a selected clock frequency, comprising:
    counter means, responsive to clock pulse signals for counting clock pulses and providing a frame output signal pulse upon reaching a selected clock pulse count, said counter means providing said frame output signal pulse at a selected frame frequency equal to the quotient of the selected clock frequency divided by said selected clock pulse count, said counter means also responsive to an input voted frame sync signal pulse from a selected synchronizer within the channel associated with said counter means for resetting said counter means' count; and
    voter means, responsive between occurrences of sasid input voted frame sync signal pulse to a plurality of incoming counter frame output signal pulses, one counter frame output signal pulse from each of the channels in the system, for providing an output voted frame sync signal pulse upon or after reception of a selected number of separate counter frame output signal pulses, each of said separate pulses from a different channel in the system.

2. The synchronizer of claim 1, wherein said voter means further comprises:
    rising edge voter means, responsive to the rising edges of said plurality of incoming counter frame output signal pulses, for providing a voted arm signal in a frame period upon or after reception of a selected number of rising edges corresponding to said selected number of separate counter frame output signal pulses; and
    falling edge voter means, responsive to the falling edges of said plurality of incoming counter frame output signal pulses, and responsive to said voted arm signal, for providing said output voted frame sync signal pulse only after being enabled in said frame period by said voted arm signal.

3. The syhchronizer of claim 1, further comprising:
    CPU buffer means, responsive to said plurality of incoming counter frame output signal pulses for providing said frame output signal pulses at an output port of the synchronizer
    CPU latch means, responsive to a disable signal provided by the synchronizer's associated channel for storing and providing said disable signal; and
    disable gating means, responsive to said incoming frame output signa pulses and to said stored disable signal from said CPU latch means for disabling frame signal pulses from a particular channel upon or after reception of said disable signal by preventing said voter means from receiving any frame output signal pulses from said particular channel.

4. The synchronizer of claim 3, wherein said voter further comprises vote select means, responsive to a vote select signal, indicative of said slected number, said vote select signal provided by the synchronizer's associated channel to said CPU latch means, wherein said channel may change the magnitude of said vote select signal to become indicative of another selected number lesser than said selected number.

5. The synchronizer of claim 1, wherein said voter means further comprises:
    latch means, responsive between occurrences of said input voted frame sync signal pulse (defining a frame period) to said counter means' frame output signal pulse and to said plurality of incoming counter frame output signal pulses, for synchronously providing, in each frame period, latched signals indicative of the states of said counter menas' frame output signal pulse in each frame period and the states of said incoming counter frame output signal pulses in each frame period; and
    gating means, responsive to said latched signals for providing said voted frame sync signal pulse in the presence of said selected number of latched signals in each frame period.

6. The synchronizer of claim 1, wherein said voter means further comprises:
    ones adder means, responsive to said plurality of incoming counter frame output signal pulses for providing an adder output signal indicative of the number of counter pulses received between occurrences of said input voted frame sync signal pulses (defining a frame); and
    logic means, responsive to said adder output signal and to a vote select signal indicative of said selected number, said vote select signal provided from within the channel associated with said counter means, said logic means comparing said adder output signal to said vote select signal and providing said output voted frame sync signal pulse only if the number of counter pulses received in a frame is greater or equal to said selected number.

7. The synchronizer of claim 1, wherein said voter means further comprises:
    ones adder means, responsive between occurrences of said input voted frame sync signal pulses (defining a frame period) to said plurality of incoming counter frame output signal pulses for providing an adder output signal indicative of the number of enabled counter frame output signal pulses in a frame period; and
    magnitude comparator means, responsive to said adder output signal and to a vote select signal indicative of said selected number from within the channel associated with said counter means for comparing said adder output signal to said vote select signal and providing said output voted frame sync signal pulse only if the number of enabled counter output signals, of which said adder output signal is indicative, is greater or equal to asid selected number as indicated by said vote select signal.

8. The synchronizer of claim 1, further comprising:
    fast sync pulse detector means, responsive to the synchronizer's counter means' frame output signal pulses for detecting an increase in said frame frequency and providing a fast sync pulse interrupt signal indicative thereof to the channel associated with the synchronizer.

9. The synchronizer of claim 1, further comprising:
slow sync pulse detector means, responsive to the synchronizer's counter means' frame output signal pulses for detecting a decrease in said frame frequency and providing a slow sync pulse interrupt signal indicative thereof to the channel associated with the synchronizer.

10. The synchronizer according to claim 1, further comprising:
a plural counter output signal ports, each responsive to said counter means' frame output signal pulses, each port providing said counter frame output signal pulses; and
plural counter input signal ports, each responsive to incoming counter frame output signal pulses from each of the channels in the system or, as a slave synchronizer of a selected number of the channels in the system or, as a master synchronizer, from each of any associated slave synchronizers in a channel.

11. The synchronizer according to claim 1, further comprising, voter enabler means, responsive between occurrences of said input voted frame sync signal pulse (defining a frame period) to count signals generated by said counter, said count signals being indicative of the present clock pulse count of said counter means, for providing a voter enable signal to said voter means, for enabling said voter means during a timed portion of each frame period during which timed portion said synchronizer's counter means is expected to provide a frame output signal pulse.

12. The synchronizer of claim 1, wherein said counter means is responsive to said input voted frame sync signal pulse at an input port of the synchronizer, wherein said voter means provides said output voted frame sync signal pulse at an output port of the synchronizer.

13. A synchronizer for use in a multi-channel system, each channel having an associated oscillator for providing clock pulse signals at a selected frequency and each channel having such a synchronizer associated therewith, said synchronizer comprising:
counter means, responsive to the clock pulse signals for counting clock pulses and providing a frame output signal pulse upon reaching a selected count, said counter means repeatedly providing said frame output signal pulse at a selected frame frequency equal to the quotient of the selected frequency divided by said selected count, said counter means also responsive to a voted frame sync signal pulse for resetting said counter; and
voter means, responsive between occurrences of said input voted frame sync pulse to a plurality of incoming counter frame output signal pulses, for providing a voted frame sync signal pulse at said selected frame frequency for resetting the count of said counter means upon or after reception of a selected number of frame output signal pulses.

* * * * *

UNITED STATES PATENT AND TRADEMARK OFFICE
CERTIFICATE OF CORRECTION

PATENT NO. : 4,696,019

DATED : September 22, 1987

INVENTOR(S) : Bhalchandra R. Tulpule et al

It is certified that error appears in the above-identified patent and that said Letters Patent is hereby corrected as shown below:

Column 17, claim 1, line 29.    Cancel "sasid" and substitute -- said --

Column 17, claim 3, line 63.    Cancel "signa" and substitute -- signal --

Column 18, claim 4, line 3.     Cancel "slected" and substitute -- selected --

Column 18, claim 5. line 18.    Cancel "menas'" and substitute -- means'" --

Column 18, claim 7, line 61.    Cancel "asid" and substitute -- said --

Signed and Sealed this

First Day of November, 1988

Attest:

DONALD J. QUIGG

*Attesting Officer*    *Commissioner of Patents and Trademarks*